US005570388A

United States Patent [19]
Halpern

[11] Patent Number: 5,570,388
[45] Date of Patent: Oct. 29, 1996

[54] METHOD AND APPARATUS USING SIMPLE CODES FOR THE WIRELESS TRANSMISSION OF NON-DATA SYMBOLS

[75] Inventor: Peter H. Halpern, Longwood, Fla.

[73] Assignee: Digital Ocean, Inc., Lenexa, Kans.

[21] Appl. No.: 312,840

[22] Filed: Sep. 27, 1994

[51] Int. Cl.$^6$ .................................................. H04K 1/00
[52] U.S. Cl. ........................ 345/200; 345/242; 345/281
[58] Field of Search .................................. 375/200, 206, 375/281, 242, 207; 370/99, 111; 360/40; 341/52, 55

[56] References Cited

U.S. PATENT DOCUMENTS

| | | | |
|---|---|---|---|
| 3,921,210 | 11/1975 | Halpern | 360/40 |
| 4,312,070 | 1/1982 | Coombes et al. | 371/40 |
| 4,383,322 | 5/1983 | Halpern et al. | 375/200 |
| 4,403,331 | 9/1983 | Halpern et al. | 375/259 |
| 4,601,046 | 7/1986 | Halpern et al. | 375/260 |
| 4,649,549 | 3/1987 | Halpern et al. | 380/32 |
| 4,924,463 | 5/1990 | Thomas et al. | 370/105.4 |

OTHER PUBLICATIONS

Bruce Tuch, Development of WaveLAN an ISM Band Wireless LAN, AT&T Technology Journal, Jul./Aug. 1993, vol. 72, No. 4, pp. 27–37.
Peter H. Halpern, The Use of Matched Filters for Synchronization.
Accredited Standards Committee, FDDI Physical Layer Protocol, Aug. 6, 1992.

Primary Examiner—Stephen Chin
Assistant Examiner—T. Ghebretinsae
Attorney, Agent, or Firm—Laubscher & Laubscher

[57] ABSTRACT

A wireless data communication system includes a code encoder for transforming pulse code modulated data into a simple code having an alphabet with at least one spare symbol into which a delimiter symbol is introduced, which code is transmitted to a receiver including a matched filter arrangement and a code maximum decision arrangement for decoding the transmitted code signal and for detecting the delimiter symbol.

5 Claims, 3 Drawing Sheets

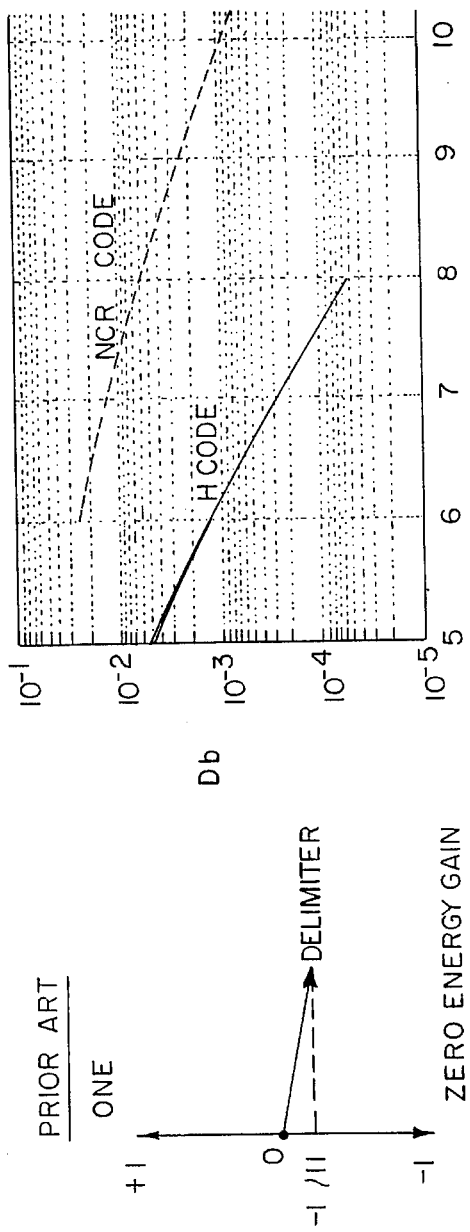
FIG. 4
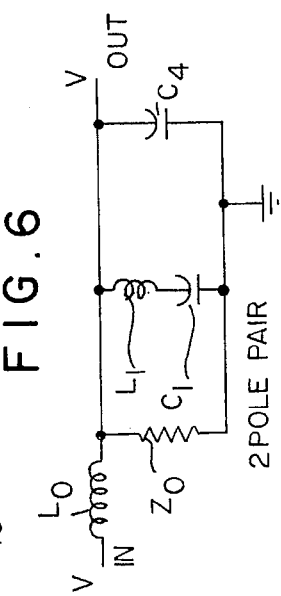
FIG. 6
2 POLE PAIR
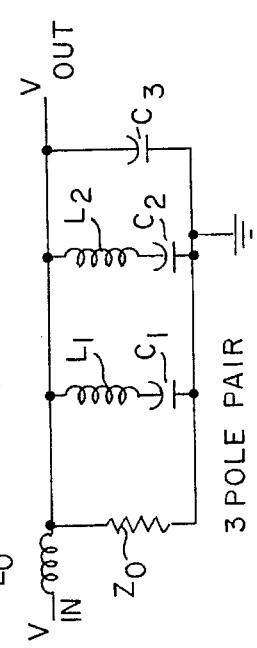
FIG. 7
3 POLE PAIR
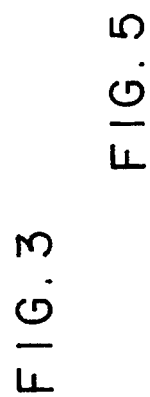
FIG. 3
FIG. 5

PRIOR ART

| DECIMAL | BINARY<br>A B C D | H - CODE<br>U V W X Y Z | SIGNAL | |
|---|---|---|---|---|
| 0 | 0 0 0 0 | 1 1 1 0 0 0 | S1 | |
| 1 | 0 0 0 1 | 0 0 0 1 1 1 | S1 | |
| 2 | 0 0 1 0 | 1 1 0 1 0 0 | S2 | |
| 3 | 0 0 1 1 | 0 0 1 0 1 1 | S2 | |
| 4 | 0 1 0 0 | 1 1 0 0 1 0 | S3 | |
| 5 | 0 1 0 1 | 0 0 1 1 0 1 | S3 | ENCODING/ DECODING TABLE |
| 6 | 0 1 1 0 | 1 1 0 0 0 1 | S4 | |
| 7 | 0 1 1 1 | 0 0 1 1 1 0 | S4 | |
| 8 | 1 0 0 0 | 1 0 1 1 0 0 | S5 | |
| 9 | 1 0 0 1 | 0 1 0 0 1 1 | S5 | |
| 10 | 1 0 1 0 | 1 0 1 0 0 1 | S6 | |
| 11 | 1 0 1 1 | 0 1 0 1 1 0 | S6 | |
| 12 | 1 1 0 0 | 1 0 0 1 1 0 | S7 | |
| 13 | 1 1 0 1 | 0 1 1 0 0 1 | S7 | |
| 14 | 1 1 1 0 | 1 0 0 1 0 1 | S8 | |
| 15 | 1 1 1 1 | 0 1 1 0 1 0 | S8 | |
| DL1 | | 1 0 0 0 1 1 | S9 | |
| DL2 | | 0 1 1 1 0 0 | S9 | |
| DL3 | | 1 0 1 0 1 0 | S10 | |
| DL4 | | 0 1 0 1 0 1 | S10 | |

METHOD AND APPARATUS USING SIMPLE CODES FOR THE WIRELESS TRANSMISSION OF NON-DATA SYMBOLS

SPECIFICATION

A method and apparatus are disclosed for the wireless transmission and reception of non-data symbols without the introduction of errors, use being made of transmitter means including encoder means, such as an H-code encoder, for converting a pulse code modulated input signal into an H-code signal certain spare symbols of which are used for the delimiter symbol, and receiver means including matched filter reset integrator means and H-code maximum likelihood decision means for detecting the H-code and the delimiter non-data symbols.

BRIEF DESCRIPTION OF THE PRIOR ART

In the wireless transmission of digital data, it is desired to include non-data delimiter symbols, such as a start signal indicating the beginning of data transmission. When it is attempted to inject a non-data signal between two antipodal signals without going to higher dimensions, an undesirable noise loss on the order of 6 Db is produced.

In the article "Development of Wave LAN, an ISM Band Wireless LAN" by Bruce Tuch, AT&T Technical Journal July/August, 1993, pages 27–37, a discussion is presented of the design philosophy in the development of NCR's Wave LAN and the technical tradeoffs. The system includes spread spectrum encoding of two components of a signal, one containing the information (I), and the other spread spectrum characteristics of the signal (Q). The components are individually modulated with the spread spectrum signal, filtered, then combined for transmission by the power driver. It has further been proposed in the prior art to provide an embedded delimiter symbol (L) in a data transmission sequence, as proposed in the FDDI Physical Layer Protocol (Phy-2), Draft Proposed American National Standard, Jun. 17, 1992.

In another prior art system produced by the National Cash Register Corporation (NCR), a nearly orthogonal signal is used for the delimiter with an attendant penalty of 3.42 Db, as compared to antipodal pulse code modulation. Moreover, the introduction of delimiter symbols is difficult to accomplish on a bit-to-bit basis.

In order to avoid the drawbacks of the known prior art communication systems, the present invention was developed wherein code means are used for transmitting the delimiter symbols in an error-free manner. By encoding several bits per symbol or baud, the penalty of signal-to-noise ratio loss is avoided, and a modest coding gain is achieved in spite of the extra non-data symbols.

The prior Halpern U.S. Pat. No. 3,921,210 discloses encoding and decoding means for converting four-bit binary words into an H-code alphabet, and vice versa. The system provides improved encoding and decoding of digital data so as to enable the handling thereof at high density with minimal degradation of error performance. Also, in the prior Halpern et al U.S. Pat. No. 4,649,549, a spread spectrum communication system is disclosed in which a baseband signal with a bandwidth of only a few kilohertz that is distributed over a band that is many megahertz wide. This is accomplished by modulating with the information to be sent, and with a wideband encoding signal-code synchronization is required in all spread spectrum systems, since the code is the key to despreading desired information and to spreading any undesired signals.

In the published article "The Use of Matched Filters for Synchronization" by Peter H. Halpern, International Telemetry Conference, Los Angeles, Calif. 1972, the use of matched filters in communication systems has been proposed, which filters are responsive to a transition or a change of state of the data. Once having detected the occurrence of transition events it is easy to derive automatic gain control and offset control signals as well as the control signal for phase locked loops.

SUMMARY OF THE INVENTION

Accordingly, a primary object of the present invention is to provide a method and apparatus for introducing a non-data symbol into an antipodal pulse code modulated data signal that is to be transmitted in a wireless communication system, characterized by the use of encoder means for generating a code having an alphabet with spare symbols that are used in transmitting the delimiter symbol.

According to a more specific object of the invention, the transmitter encoding means includes an H-code encoder for encoding several bits per symbol or baud, thereby avoiding the penalty of signal-to-noise ratio loss, and a modest coding gain in spite of extra non-data symbols. In addition to coding gain, the H-codes proposed for use in this invention have no DC content, thereby simplifying the radio design and permitting direct magnetic recording. Enough non-data symbols are available so that all quaternary phase-shift keying (QPSK) ambiguities can be directly resolved, thereby avoiding the error multiplication of differential QPSK. The code signal containing the delimiter symbols is transmitted by spread spectrum techniques.

According to a further object of the invention, a receiver circuit is provided having QPSK demodulation and despreading synchronizer means, together with subbit matched filter reset integrator means for detecting the transmitted code and delimiter symbols. The present invention has utility in data transmission systems for wireless local area networks (LANS), computer networks, hospital bed monitoring, telemetry, and wireless systems involving radios, such as cellular radios. The reset integrator means is basically a passive filter which is acted upon digitally to form all the linear sums and differences, and H-code maximum likelihood decision means make a decision based on the data to identify the H-code word comprising the delimiter symbol.

BRIEF DESCRIPTION OF THE DRAWINGS

Other objects and advantages of the invention will become apparent from a study of the following specification, when viewed in the light of the accompanying drawings, in which:

FIG. 3 is a graph illustrating the operation of a delimiter system of the prior art, and FIG. 4 is a graph comparing the operating of the present invention against that of a system of the prior art;

FIG. 5 illustrates the waveforms of the two channels of the transmitting system of the present invention;

FIGS. 6 and 7 illustrate two-pole and three-pole embodiments, respectively, of the matched filter reset integrator transition detecting means of FIG. 2;

DETAILED DESCRIPTION

Figures 8, 9:
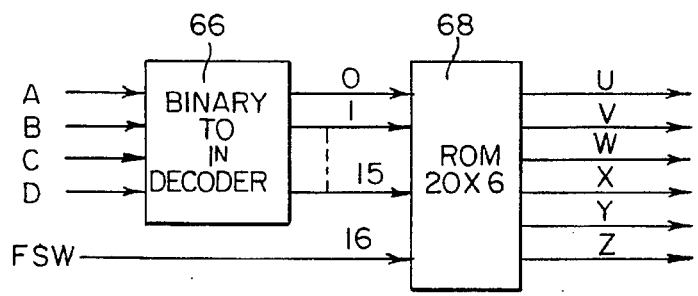
FIG. 8 is a block diagram of the encoding logic means for encoding a four-bit input signal into a six-bit output signal.
FIG. 9 illustrates a basic H-code alphabet.

Referring first more particularly to FIGS. 8 and 9, as shown by the aforementioned Halpern U.S. Pat. No. 3,921,210, it is known in the art to encode a 4-bit input signal to produce a six-bit H-Code. Three of the subbits are positive, and three are negative. Consequently, in a "6 choose 3" system where the bit rate is less than the chip rate, there are 20 such signals available, in accordance with:

$$\frac{6 \times 5 \times 4}{3 \times 2 \times 1} = 20$$

each having no DC content. Only 16 signals are required to encode 4 bits of information, and, in accordance with the present invention, the remaining 4 code words are used for transmitting the delimiter symbols.

According to an alternate H-code code system, a 6 bit pulse code modulated data signal is encoded into 8 subbits 4 of which are positive, and 4 of which are negative.

By "8 choose 4" techniques, the resulting 70 symbols afford space for 6 delimiter symbols while still encoding 6 bits of information.

Assuming that the spreading and despreading successfully convert interference into additive white Gaussian noise, the ability to distinguish between any pair of signals depends on the energy of the difference signals. Normalizing to unit time per information bit, it is seen that the simpler code has symbols which differ in at least 2 subbits and hence provides a coding gain of 4/3 in energy, while the second code provides an energy gain of 3/2. The asymptotic gain is modified by the fact that there are a number of close neighbors.

In the prior delimiting system developed by NCR/AT&T, an almost orthogonal sequence for the delimiter signal is used, as shown in FIG. 3. Referring to FIG. 4, the large difference in performance between the use of the H-code of the present invention and the NCR delimiter code is presented. The simulated results of the graph assumes that unbiased detectors are used for the delimiter signals. The NCR approach uses a nearly orthogonal delimiter signal for the delimiter with an attendant penalty of 3.42 DB compared to antipodal PCM, while in the H-code system of the present invention, several bits per symbol or baud are encoded, thereby avoiding the penalty of signal-to-noise reduction, and in fact a modest coding gain is achieved despite the extra non-data symbols. The simpler first H-code gains 1.25 Db with respect to antipodal pulse code modulation, while the second-code gains 1.76 Db.

Figure 1:
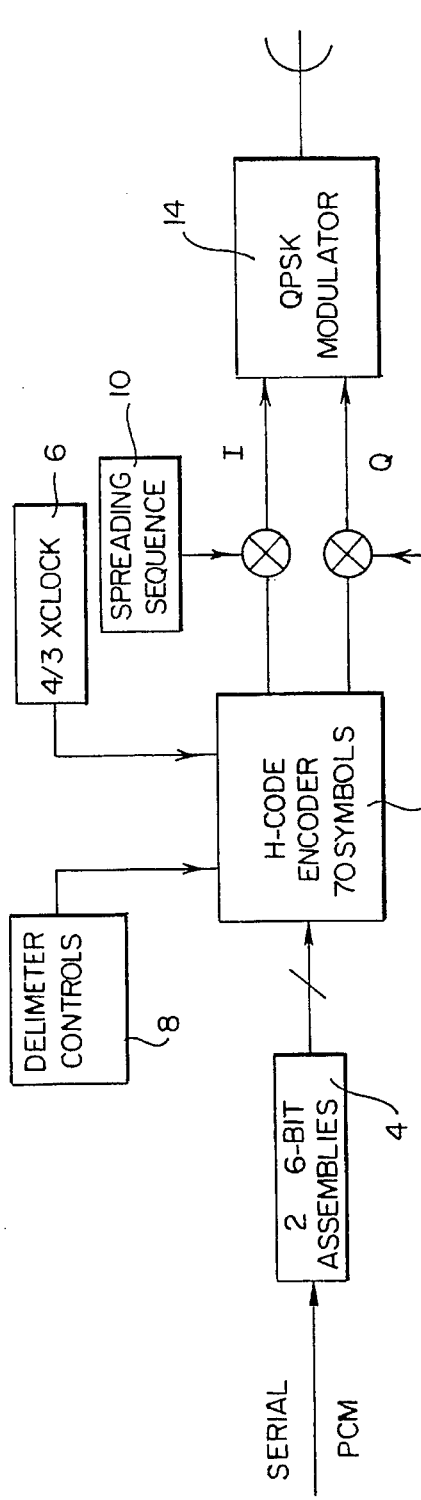
FIG. 1 is a block diagram of the encoding and signal transmitting system of the present invention.
Figure 2:
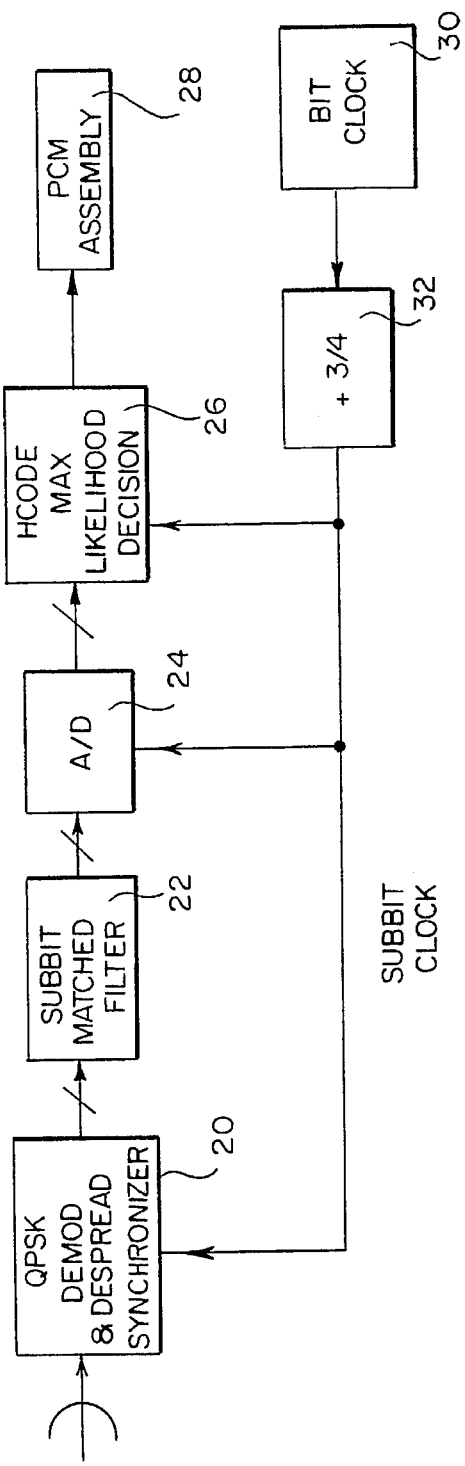
FIG. 2 is a block diagram of the receiving and decoding system of the invention.

Referring now to FIGS. 1 and 2, the digital information transmitting and receiving wireless communication system of the present invention is operable to construct a header with an unambiguous sync point and a test for quaternary phase shift keying ambiguities. The codes may be regarded as being prespreaders for use in conjunction with any other spreading technique. The antipodal serial pulse-code-modulated data input signal to be transmitted is supplied to the H-code encoder 2 via a pair of 6-bit byte assemblies 4, which bytes are encoded by the encoder means 2 (FIG. 8) that form the H-code of FIG. 9. Signals from the 4/3X clock 6 and the limiter symbols supplied by the delimiter control means 8 are supplied to the H-code encoder 2. The output signals at the I and Q channels are spread by spread sequence means 10 and 12, preferably having a longer sequence than a 11-bit Barker sequence. The resulting spread spectra of both the long and short periodic sequences have the autocorrelation function:

$$R(x) = 1 - \frac{n+1}{n} |x| \quad \text{for } |x| < \gamma$$

$$= -\frac{1}{n} \quad \text{for } \gamma < |x| < (n-1)\gamma$$

$R(x)$ is periodic with period $n\gamma$. This periodic autocorrelation function produces a line spectrum and has Fourier coefficients:

$$C_k = \frac{2}{n\tau} \int_0^{n\tau} (Rx) \cos\left(\frac{2k\pi\tau}{n\tau}\right) dx = \frac{1}{k^2\pi^2} (1 - \cos(2k\pi/n))$$

Here n is the length of the sequence and $\gamma$ is the chip period. The larger n is, the finer are the needles and the better narrow band interference is avoided.

In the system including quaternary phase-shift keying (QPSK), the I and Q channels are modulated with the spread H-code. In the simpler first code, an entire byte or baud is encoded for each QPSK symbol. The preamble consists of consecutive bauds with the fewest subbit transitions. Three subbit ones are followed by three subbit zeros (i.e., the first H-code word in FIG. 9), and the following baud is the complement. This structure produces 6 consecutive subbits with no transitions (as shown in FIG. 9), and a unique phase:

$$\int_{t-6d}^{t} e(x)dx = 0.$$

where d is the subbit time duration. This test allows quick baud sync. Allowing enough time to achieve all the synchronization, the delimiter control means 8 applies to the H-code encoder 2 a non-data symbol—for example, alternate one-zero subbits—on the I channel. Simultaneously, any other fixed symbol is applied to the Q channel. The complement of the delimiter symbol is reserved for a delimiter also. In this manner, the I and Q ambiguities are resolved. The I and Q signals are supplied to the quaternary phase-shift keying modulator 14 for transmission to the receiver. Preferably, 12 bits are encoded for each QPSK symbol, and the initialization is done with the lowest frequency symbols.

At the H-code receiver end shown in FIG. 2, a QPSK demodulator and despreader is used to strip off the H-code in a manner similar to the system disclosed in the Halpern et al U.S. Pat. No. 4,649,549. More particularly, the received signal is applied to the quaternary phase-shift keying demodulator and despread synchronizer 20 the output of which is fed to a reset intergrator subbit-matched filter 22 (for example, the 2-pole or 3-pole matched filters of FIGS. 6 or 7, respectively). The filter output signal is supplied to the analog-to-digital converter 24, and to the H-code maximum likelihood decision means 26, whereupon the resultant signal is supplied to the pulse code modulator assembly 28. Bit clock means 30 and the positive ¾ clock divider 32 supply ¾ subbit clock signals to the QPSK demodulator and despread synchronizer 20, to the analog-to-digital converter 24, and to the H-code maximum likelihood decision means 26, thereby to synchronize the resulting bit streams.

The matched filter means 22 serve as reset integrator matched filters synthesized in accordance with the published paper "The Use of Matched Filters for Synchronization", by Peter H. Halpern. Each synchronizer consists of two parts, the first of which is a detector designed to give the best possible estimate of the time of events, and the second of which is a normally phase-locked loop for optimally processing the independent estimates of the detector. To detect the time of occurrence of f(f) as accurately as possible in a white noise background, the matched filter means maximizes the derivative-to-noise ratio at t=τ as the output crosses some threshold. Accurate reset integrator approximations are:

$$L_0 = \frac{1}{2} Z_0 \tau$$

$$L_1 = L_2 = \frac{1}{4} Z_0 \tau$$

$$C_1 = \frac{\tau}{\pi^2 Z_0}$$

$$C_2 = \frac{\tau}{4 \pi^2 Z_0}$$

$$C_3 = \frac{0.4 \tau}{\pi^2 Z_0}$$

$$C_4 = \frac{0.67 \tau}{\pi^2 Z_0}$$

The filters are synchronously sampled and converted to digits. The matched filters for the H-code symbols are all sums and differences of the subbit matched filter samples. The decision of which H-code was transmitted is based on which matched filter is largest, as determined by the maximum likelihood decision means 26, which then converts the H-code back into a pulse code modulated data stream or signal.

Up to six non-data symbols can be provided for use in various tests and controls, such as a start symbol in a header.

While in accordance with the Patent Statutes the preferred forms and embodiments of the invention have been illustrated and described, it will be apparent to those skilled in the art that various changes may be made with deviating from the inventive concepts set forth above.

What is claimed is:

1. A wireless communication system for transmitting a serial pulse-code modulated digital data stream and a non-data delimiter symbol to a receiver, comprising:

(a) encoder means including an encoder (2) for encoding the data stream in accordance with a code having an alphabet with at least one spare symbol;

(b) delimiter control means (8) for applying a delimiter symbol in the code alphabet spare symbol, thereby to produce a coded data stream including said delimiter symbol;

(c) means including a quaternary phase-shift keying modulator (14) for transmitting the coded data stream to the receiver;

(d) receiver means including a quaternary phase-shift keying demodulator (20) for demodulating the coded data stream;

(e) means including matched filter means (22), analog-to-digital converter means (24), and code maximum likelihood decision means (26) for detecting the code and the delimiter symbol; and (f) means (28) for assembling the transmitted data into a pulse code modulated data stream.

2. Apparatus as defined in claim 1, wherein said encoder means includes a two-channel output at which a pair of channel signals (I, Q) are produced; and further including:

(g) spread spectrum means (10,12) for spreading said two channel signals, said receiver means including corresponding signal despreading means (20).

3. Apparatus as defined in claim 2, wherein said receiver includes synchronizer means (30,32) for synchronizing said quaternary phase shift keying demodulator, said analog-to-digital converter means, and said code maximum likelihood decision means.

4. Apparatus as defined in claim 3, wherein said data encoder means includes bit assembly means (4) for forming the data bits into a plurality of bauds, said bauds being encoded for every quaternary phase shift keying symbol, the consecutive bauds with the fewest subbit transitions serving as said delimiter symbol, and the next following baud comprising the complement of the delimiter baud.

5. The method for transmitting a stream of serial pulse code-modulated digital data and a delimiter symbol to a receiver, which comprises the steps of:

(a) assembling the data into bytes of a given bit length;

(b) encoding the data bytes into code having an alphabet of which includes at least one spare symbol, and introducing the delimiter symbol as said alphabet spare symbol, thereby to produce a pair of output channel coded data streams (I,Q);

(c) spreading said output channels to produce a pair of spread spectrum coded data streams;

(d) modulating said spread spectrum coded data streams by a quaternary phase-shift keying modulator, thereby to produce a phase-shifted coded data stream;

(e) transmitting the phase-shifted coded data stream;

(f) receiving the transmitted coded data stream;

(g) demodulating and despreading the received coded data stream;

(h) detecting the code and the delimiter symbol from the received coded data stream by means of matched filter means, analog-to-digital converter means, and code maximum likelihood decision means; and (i) assembling the transmitted data into a pulse code modulated data stream.

* * * * *